Patented Jan. 24, 1950

2,495,293

UNITED STATES PATENT OFFICE 2,495,293

POLYMERIC POLYTHIOLS

Samuel L. Scott, Wilmington, Del., assignor to E. I. du Pont de Nemours & Company, Wilmington, Del., a corporation of Delaware No Drawing. Application February 19, 1948, Serial No. 9,619

5 Claims. (Cl. 260—63)

This invention relates to polymeric polythiols and more particularly to new polymeric polythiols which are derived from monoolefin/carbon monoxide polymers and to methods for their preparation.

Thiols and many other compounds containing one or more thiol groups are recognized as being important classes of intermediates for organic syntheses. The development and commercial utilization of simple and substituted thiols has been hindered, except for a few isolated cases, either by lack of suitable low cost raw materials or by unavailability of practical methods of preparation. It has been proposed, for example, to produce aliphatic thiols by the interaction of organic halogen compounds and sodium hydrosulfide or sodium thiosulfate. Although in several instances, particularly in the synthesis of primary thiols, this method gives good results, its commercial scope has been limited both by the high cost and relative scarcity of suitable halogen compounds. The literature also contains disclosures of methods for the synthesis of aliphatic thiols by addition of hydrogen sulfide to ethylenic compounds. Catalytic methods for the synthesis of thiols from organic sulfur compounds containing reducible sulfur-oxygen, carbon-sulfur, and sulfur-sulfur groups or groups reducible to such groups, in the presence of hydrogen sulfide, are also known. By these catalytic processes sulfur containing polymers in which the sulfur is intralinear can be cleaved to thiols.

It is an object of this invention to provide new and useful polymeric polythiols and methods for their preparation. A further object is to provide new polymeric polythiols derived from monoolefin/carbon monoxide polymers. A still further object is to provide new polymeric polythiols derived from ethylene/carbon monoxide polymers. Other objects will appear hereinafter.

The objects of this invention are accomplished by providing polymeric polythiols which are the reaction products of the reductive-thiolation of a monoolefin/carbon monoxide polymer with hydrogen and hydrogen sulfide in which polymer the mole ratio of monoolefin to carbon monoxide is from 150:1 to 1:1. This invention provides new polymeric polythiols in which the thiol groups are present as lateral substituents on the polymeric chain. Thus the polymeric polythiols of this invention have a main carbon chain and thiol groups as lateral substituents with the sulfur of said thiol groups directly attached to a carbon atom which is an integral part of said main carbon chain. The polymeric polythiol may also contain carbonyl carbon in the chain of contiguous carbon atoms comprising the main carbon chain of said polythiol.

The polymeric polythiols of this invention are prepared by subjecting a monoolefin/carbon monoxide polymer in which the mole ratio of monoolefin to carbon monoxide is from 150:1 to 1:1 and preferably from 50:1 to 1:1 to catalytic hydrogenation in the presence of hydrogen sulfide, or a substance yielding hydrogen sulfide under the conditions of reaction, over a sulfactive hydrogenation catalyst. As an illustrative example, a monoolefin/carbon monoxide polymer is charged into a high pressure reactor, together with hydrogen, an excess of hydrogen sulfide, and a sulfactive hydrogenation catalyst. The reactor is closed, agitated, and heated to a temperature at which reaction occurs at a suitable rate. Additional hydrogen is added to the autoclave as needed to maintain the partial pressure of hydrogen in the autoclave in the neighborhood of 1000 lb./sq. in. After reaction is complete, as evidenced by cessation of hydrogen absorption, the autoclave is cooled, the catalyst is separated from the product, and the product is isolated. In the products of this invention at least some of the carbonyl groups of the parent polymer have been replaced by thiol groups. These polymeric polythiols contain at least 0.3% of thiol sulfur.

The monoolefin/carbon monoxide polymers converted to polythiols according to this invention are the products obtained by polymerizing a monoolefin containing up to and including four carbon atoms, such as ethylene, propylene, isobutylene, or a plurality of said olefins, with carbon monoxide in the presence of a polymerization catalyst, for example, a peroxy compound, as disclosed and claimed in the application of M. M. Brubaker, U. S. Serial No. 552,374 filed September 1, 1944 and now abandoned, of which Serial No. 97,908, filed June 8, 1949, is a continuation-in-part. The monoolefin/carbon monoxide polymers contain the carbonyl carbon in the chain of contiguous carbon atoms comprising the polymer chain.

Instead of charging hydrogen sulfide as such into the reactor there may be used substances yielding hydrogen sulfide under the conditions of reaction. For example, there may be used sulfur, carbon bisulfide, or sulfur dioxide. The proportion of hydrogen sulfide, or substances yielding hydrogen sulfide used, may be varied considerably but it is desirable to employ an excess over the amount theoretically required to convert the carbonyl groups in the polymer to thiol groups.

In general, at least one mole of hydrogen sulfide, or an equivalent amount of a substance convertible to hydrogen sulfide, is employed per carbonyl group in the polymer.

The type of sulfactive catalyst employed may be varied considerably. In general the common hydrogenating metals as well as the sub-sulfides, sulfides, or polysulfides of such metals are effective. Especially useful are the sulfides and polysulfides of such metals as copper, iron, nickel, cobalt, lead, molybdenum, and the like. The metal sulfides may be used as such or supported on a suitable carrier such as charcoal, kieselguhr, alumina, magnesia, silica, etc. Typical methods for preparing these catalysts are described in U. S. Patents 2,402,683 and 2,402,684 and include precipitation methods and sulfidation of the metal or its compounds at ordinary or elevated temperatures by means of sulfur, hydrogen sulfide, or other sulfur compounds. The activity of certain of the metal sulfide catalysts may be improved by treatment with hydrogen at elevated temperatures.

The amount of sulfactive hydrogenation catalyst will be such as to provide from 1 to 20% of active catalytic component, by weight of the monoolefin/carbon monoxide polymer. Generally, the amount used will be from 5 to 10% by weight of the monoolefin/carbon monoxide polymer.

In general, the process is operable at temperatures ranging from 75° to 300° C. and at pressures of from atmospheric to a maximum determined by the mechanical limitations of the equipment employed. It is preferred to operate at a temperature of 100° to 250° C. and under a total pressure of 1,000 to 15,000 lb./sq. in.

The examples which follow are submitted to illustrate and not to limit this invention. All proportions are given in parts by weight, unless otherwise designated.

*Example I*

A stainless steel reaction vessel is charged with 64 parts of sulfur, 100 parts of an ethylene/carbon monoxide polymer having a molecular weight of 1594 and containing ethylene and carbon monoxide in the mole ratio of 5.79:1, and 20 parts of cobalt sulfide hydrogenation catalyst. The vessel is then closed, evacuated, and placed in a shaker machine and connected to a source of high-pressure hydrogen. Hydrogen is expanded into the reactor to give a pressure of 500 atm. Agitation is started, the temperature gradually raised to 150° C., and the pressure adjusted to 900 atm. The hydrogenation is continued for 14 hours, during which time the observed pressure drop is 30 atm. The reactor is then allowed to cool; excess hydrogen and hydrogen sulfide are bled off; and the mixture of product and catalyst is discharged. The reaction product is dissolved in toluene, and the solution filtered to remove the catalyst. The filtrate is then subjected to distillation to remove solvent. There is thus obtained a white, tacky, petrolatum-like product which analyzes 78.25% C, 12.23% H, and 3.85% S, and which has a molecular weight of 1140. The analytical data indicate that 23% of the carbonyl groups of the parent polymer are converted to thiol groups.

*Example II*

A stainless steel reaction vessel is charged with 64 parts of sulfur, 100 parts of an ethylene/carbon monoxide polymer containing ethylene and carbon monoxide in the mole ratio of 4.32:1, and 20 parts of cobalt sulfide hydrogenation catalyst. The vessel is closed, evacuated, placed in a shaker machine, and connected to a source of high-pressure hydrogen. Hydrogen is expanded into the reactor to a pressure of 500 atm., the temperature raised gradually to 200° C., and the pressure adjusted to 800 atm. These conditions are maintained for 15 hours, during which time the observed pressure drop is 25 atm. The reactor is allowed to cool; excess hydrogen and hydrogen sulfide are bled off, and the mixture of polythiol and catalyst discharged. The reaction mixture is diluted with benzene, warmed, purged with nitrogen to remove residual hydrogen sulfide, and filtered to remove the catalyst. Removal of the solvent from the filtrate yields 60 parts of a viscous, straw-colored liquid which analyzes 76.72% C, 11.82% H, and 7.65% S. The composition data indicate that 60% of the carbonyl groups of the parent polymer are converted to thiol groups.

*Example III*

A stainless steel reaction vessel is charged with 64 parts of sulfur, 100 parts of an ethylene/carbon monoxide polymer having a molecular weight of 1919 and containing ethylene and carbon monoxide in the mole ratio of 2.36:1, and 20 parts of cobalt sulfide hydrogenation catalyst. The vessel is closed, evacuated, placed in a shaker machine, and connected to a source of high-pressure hydrogen. Hydrogen is expanded into the reactor to give a pressure of 500 atm. Agitation is started, the temperature gradually raised to 200° C., and the pressure adjusted to 800 atm. During a reaction period of 15 hours there is an observed pressure drop of 45 atm. The reactor is then allowed to cool; excess hydrogen and hydrogen sulfide are bled off; and the mixture of product and catalyst is discharged. The reaction mixture is diluted with benzene, warmed, purged with nitrogen to remove residual hydrogen sulfide, and the solution is filtered to remove the catalyst. Removal of the solvent from the filtrate yields 78 parts of a viscous, brown liquid which analyzes 71.09% C, 10.00% H, and 14.79% S, and a molecular weight of 1698. From these data it may be calculated that 76% of the carbonyl groups in the original polymer were converted to thiol groups.

*Example IV*

A stainless steel reaction vessel is charged with 64 parts of sulfur, 100 parts of an ethylene/carbon monoxide polymer containing ethylene and carbon monoxide in the mole ratio of 4.55:1, and 20 parts of cobalt sulfide hydrogenation catalyst. The vessel is closed, evacuated, placed in a shaker machine, and connected to a source of high-pressure hydrogen. Hydrogen is expanded into the reactor to a pressure of 490 atm. Agitation is started, the temperature gradually raised to 200° C., and the pressure adjusted to 800 atm. During a 15-hour reaction period there is an observed pressure drop of 50 atm. The reactor is allowed to cool; excess hydrogen and hydrogen sulfide are bled off; and the mixture of product and catalyst is discharged. The reaction mixture is diluted with benzene, warmed, purged with nitrogen to remove residual hydrogen sulfide, and the solution is filtered to remove the catalyst. Removal of the solvent from the filtrate yields 63 parts of a soft, sticky grease which analyzes 76.53% C, 11.92% H, and 7.99% S. The composition data indicate that 65% of the carbonyl groups in the original polymer were converted to thiol groups.

Example V

A stainless steel reaction vessel is charged with 64 parts of sulfur, 100 parts of an ethylene/carbon monoxide polymer containing ethylene and carbon monoxide in the mole ratio of 5.65:1, and 20 parts of cobalt sulfide hydrogenation catalyst. The vessel is then closed, evacuated, and placed in a shaker machine and connected to a source of high-pressure hydrogen, and hydrogen is expanded into the reactor to a pressure of 500 atm. Agitation is started, the temperature gradually raised to 200° C., and the pressure adjusted to 800 atm. During a 15-hour reaction period there is an observed pressure drop of 40 atm. The reactor is allowed to cool; excess hydrogen and hydrogen sulfide are bled off; and the mixture of product and catalyst is discharged. The reaction mixture is diluted with benzene, warmed, purged with nitrogen to remove residual hydrogen sulfide, and the solution filtered to remove the catalyst. Removal of the solvent from the filtrate yields 73 parts of a fluid, clear, straw-colored liquid which analyzes 77.14% C, 12.16% H, and 7.75% S. The composition data indicate that 64% of the carbonyl groups have been converted to thiol groups.

Example VI

A stainless steel reaction vessel is charged with 64 parts of sulfur, 100 parts of an ethylene/carbon monoxide polymer having a molecular weight of 1594 and containing ethylene and carbon monoxide in the mole ratio of 5.16:1, and 20 parts of cobalt sulfide hydrogenation catalyst. The vessel is closed, evacuated, placed in a shaker machine, and connected to a source of high-pressure hydrogen. Hydrogen is expanded into the reactor to give a pressure of 490 atm. Agitation is started, the temperature gradually raised to 200° C., and the pressure adjusted to 800 atm. During a 15-hour reaction period there is an observed pressure drop of 20 atm. The reactor is allowed to cool; excess hydrogen and hydrogen sulfide are bled off; and the mixture of product and catalyst is discharged. The reaction mixture is diluted with benzene, warmed, and purged with nitrogen to remove residual hydrogen sulfide, and the solution filtered to remove the catalyst. Removal of the solvent from the filtrate yields 56 parts of a soft, petrolatum-like grease which analyzes 77.58% C, 12.19% H, and 5.91% S, and a molecular weight of 1428. The composition data indicate that 49% of the carbonyl groups have been converted to thiol groups.

Example VII

A stainless steel reaction vessel is charged with 64 parts of sulfur, 100 parts of an ethylene/carbon monoxide polymer having a molecular weight of 771 and containing ethylene and carbon monoxide in the mole ratio of 5.90:1, and 20 parts of cobalt sulfide hydrogenation catalyst. The vessel is closed, evacuated, placed in a shaker machine, and connected to a source of high-pressure hydrogen. Hydrogen is expanded into the reactor to give a pressure of 500 atm. Agitation is started, the temperature gradually raised to 200° C., and the pressure adjusted to 800 atm. During a 15-hour reaction period there is an observed pressure drop of 20 atm. The reactor is allowed to cool; excess hydrogen and hydrogen sulfide are bled off; and the mixture of product and catalyst is discharged. The reaction mixture is diluted with benzene, warmed, and purged with nitrogen to remove residual hydrogen sulfide, and the solution is filtered to remove the catalyst. Removal of the solvent from the filtrate yields 59 parts of a clear, straw-colored liquid which analyzes 76.86% C, 12.48% H, and 8.87% S, and a molecular weight of 635. The composition data indicate that 78% of the carbonyl groups have been converted to thiol groups.

Example VIII

A pressure reactor is charged with 33 parts of an ethylene/carbon monoxide polymer, prepared as described below, 38 parts of sulfur, and 5 parts of a cobalt sulfide catalyst in 35 parts of acetic acid and 100 parts of dioxane. The reactor is closed, and after evacuation is placed in a shaker machine and connected to a source of high pressure hydrogen. Hydrogen is expanded into the reactor so that at 150° to 200° C. the pressure is between 1400 and 2000 lb./sq. in. During a 6 hour reaction period there is an observed pressure drop of 1700 lb./sq. in. The reactor is allowed to cool, bled of unreacted hydrogen and hydrogen sulfide, and discharged. The catalyst is separated by filtration, and an aliquot of the product titrated for thiol sulfur. The titration indicates the presence of 0.037 equivalent of thiol sulfur. Evaporation of the solvent yields 12 parts of an amber, sticky resin analyzing 5.5% thiol sulfur. This corresponds to a conversion of 13% of the carbonyl groups present in the original polymer to thiol groups.

The ethylene/carbon monoxide polymer used in the above example is prepared as follows: A pressure reactor is charged 100 parts of dioxane and 1 part of benzoyl peroxide. The reactor is deoxygenated by sweeping it with oxygen-free nitrogen, and is then pressured to 400 atm. with ethylene and then to 500 atm. with carbon monoxide and then heated to 100° C. During a 10.25-hour reaction period during which the pressure is maintained at the indicated level by repressuring with carbon monoxide there is an indicated pressure drop of 80 atm. The reaction mixture is steam distilled to remove the dioxane. The product obtained weighs 33.3 parts and melts at 93° to 94° C. and is waxy.

Example IX

A stainless steel reactor is charged with twenty-five parts of an ethylene/propylene/carbon monoxide polymer having a molecular weight of 683 and an ethylene/propylene/carbon monoxide mole ratio of 1.26:0.64:1, five parts of a cobalt sulfide hydrogenation catalyst, and thirty-two parts of sulfur. The vessel is closed, evacuated, placed in a shaker machine, and connected to a source of high pressure hydrogen. Hydrogen is expanded into the reactor and the pressure adjusted so that at 200° C. the pressure is between 860 and 910 atm. During a 15 hour reaction period there is an observed pressure drop of 50 atm. The reactor is allowed to cool, bled of unreacted hydrogen and hydrogen sulfide, and discharged. The reaction mixture is diluted with toluene, warmed, and then filtered to remove the catalyst. Removal of the solvent from the filtrate yields 11 parts of a mobile oil having a molecular weight of 647 and analyzing 71.49% C, 10.84% H, and 13.73% S. From these data it may be calculated that 78% of the carbonyl groups of the original polymer were converted to thiol groups.

The cobalt sulfide catalyst used in the above examples was prepared as follows:

Two hundred eighty parts of sodium disulfide monohydrate is dissolved in 1750 parts of water and 75 parts of sulfur is then added to the solution with stirring until solution is complete. The solution is then filtered and added with continuous stirring, during a period of 10 minutes, to a solution of 282 parts of cobaltic chloride hexahydrate in 1750 parts of water. Stirring is continued for 15 minutes after completion of the addition. The precipitate which forms is filtered with suction and washed with water on the filter until the filter water is clear. Surface water is sucked off and the precipitate on the filter is then treated with 350 parts of denatured ethyl alcohol and the precipitate sucked dry. The dry cake is transferred to a receptacle and dispersed in 3500 parts of denatured ethyl alcohol. The slurry is then filtered and the product sucked dry on the filter. The cake is transferred to a vacuum drier and dried under vacuum for 24 hours at steam bath temperature. The flask is allowed to cool, the vacuum is ruptured and the dried cobalt sulfide wet with benzene. The wet cobalt sulfide is then ground to a fine powder. It is stored in containers with air-tight closures since it is pyrophoric.

A typical preparation of a monoolefin/carbon monoxide polymer, e. g., an ethylene/carbon monoxide polymer employable in the practice of this invention is the following: A pressure reactor is swept free of air with deoxygenated nitrogen, charged with 3 parts of di(tertiary butyl) peroxide and 100 parts of cyclohexane, closed and evacuated. The reactor is then placed in a heated shaker box, and connected to a high pressure source of mixed gas containing 88% ethylene and 12% carbon monoxide. Ethylene/carbon monoxide gas is expanded into the reactor to a pressure of 40 atm., and heating and agitation are started. The temperature of the reaction mixture is raised to 135° C. and maintained in the range of 130° to 140° C. for 15 hours, during which time the pressure is adjusted to about 133 atm. by repressuring with the ethylene/carbon monoxide gas mixture. The vessel is then cooled, excess ethylene and carbon monoxide are bled off, and the vessel is opened. The reaction product comprises a mixture of ethylene/carbon monoxide polymer and cyclohexane. The removal of the cyclohexane by distillation leaves the ethylene/carbon monoxide polymer as a non-volatile residue. Sixty parts of a white, tacky, beeswax-like product melting at 60° to 95° C., and containing ethylene and carbon monoxide in a mole ratio of 5:1, is obtained.

If desired, a minor amount of another polymerizable monomer can be included with the monoolefin, or monoolefins and carbon monoxide in the polymerization charge. Examples of such other polymerizable monomers are vinyl compounds, e. g., vinyl chloride, vinyl acetate, styrene, vinylidene compounds, e. g., methyl methacrylate, methyl acrylate, vinylidene chloride, vinylene compounds, e. g., dimethyl maleate, maleic anhydride, etc.

In place of the catalysts heretofore mentioned, there may be used ruthenium catalysts either as finely divided ruthenium metal or in the form of its oxide or salts. The ruthenium catalyst may be supported or it may be unsupported. A suitable method for preparing, for example, a charcoal supported ruthenium catalyst consists in fusing ruthenium or its oxide with sodium peroxide, dissolving the salt, pouring the resulting solution over charcoal and drying the impregnated charcoal. Other methods, however, may be used such as that of U. S. Patent 2,079,404 or other procedures based on the reduction of a compound of ruthenium in the presence of a carrier substance.

Although in the examples there are indicated certain definite conditions of temperature, pressure, concentration, duration of reaction, catalyst concentration, etc., it is to be understood that these may be varied somewhat within the scope of this invention since the conditions of each experiment are determined by the particular monoolefin/carbon monoxide polymer treated, the quantity employed, and the catalyst used.

The hydrogenation of the monoolefin/carbon monoxide polymers in the presence of hydrogen sulfide may be carried out in the presence or absence of solvents. Suitable solvents include dioxane, saturated aliphatic and cycloaliphatic hydrocarbons, and the like.

The process of this invention may be carried out either as a batch or as a semi-continuous or continuous operation.

By the process of this invention there may be prepared secondary thiols in which the thiol groups are present as lateral substituents on the polymer chain.

The polymeric polythiols produced in accord with this invention may be oxidized to polysulfonic acids or to polysulfides which are useful per se as wool lubricants, etc. or as intermediates for other syntheses.

As many apparently widely different embodiments of this invention may be made without departing from the spirit and scope thereof, it is to be understood that this invention is not limited to the specific embodiments thereof except as defined in the appended claims.

I claim:
1. A polymeric polythiol which is the reaction product of the reductive-thiolation with hydrogen and hydrogen sulfide at a temperature of 75° to 300° C. of a polymer of 1 molar equivalent of carbon monoxide and from 1 to 150 molar equivalents of a monoolefin containing from 2 to 4 carbon atoms, said polymeric polythiol having a main chain of contiguous carbon atoms and having thiol groups as lateral substituent groups thereon with the sulfur of each thiol group directly attached solely to hydrogen and to a carbon atom which is an integral part of said main chain of contiguous carbon atoms.

2. A polymeric polythiol which is the reaction product of the reductive-thiolation with hydrogen and hydrogen sulfide at a temperature of 75° to 300° C. of a polymer of 1 molar equivalent of carbon monoxide and from 1 to 150 molar equivalents of a monoolefin containing from 2 to 4 carbon atoms, said polymeric polythiol having a main chain of contiguous carbon atoms containing carbonyl carbon therein and having thiol groups as lateral substituent groups thereon with the sulfur of each thiol group directly attached solely to hydrogen and to a carbon atom which is an integral part of said main chain of contiguous carbon atoms.

3. A polymeric polythiol which is the reaction product of the reductive-thiolation with hydrogen and hydrogen sulfide at a temperature of 75° to 300° C. of a polymer of 1 molar equivalent of carbon monoxide and from 1 to 150 molar equivalents of ethylene, said polymeric polythiol having a main chain of contiguous carbon atoms and having thiol groups as lateral substituent groups thereon with the sulfur of each thiol group directly attached solely to hydrogen and to a carbon atom which is an integral part of said main chain of contiguous carbon atoms.

4. A polymeric polythiol which is the reaction product of the reductive-thiolation with hydrogen and hydrogen sulfide at a temperature of 75° to 300° C. of a polymer of 1 molar equivalent of carbon monoxide and from 1 to 150 molar equivalents of ethylene, said polymeric polythiol having a main chain of contiguous carbon atoms containing carbonyl carbon therein and having thiol groups as lateral substituent groups thereon with the sulfur of each thiol group directly attached solely to hydrogen and to a carbon atom which is an integral part of said main chain of contiguous carbon atoms.

5. A polymeric polythiol which is the reaction product of the reductive-thiolation with hydrogen and hydrogen sulfide at a temperature of 75° to 300° C. of a polymer of 1 molar equivalent of carbon monoxide and from 1 to 50 molar equivalents of ethylene, said polymeric polythiol having a main chain of contiguous carbon atoms containing carbonyl carbon therein and having thiol groups as lateral substituent groups thereon with the sulfur of each thiol group directly attached solely to hydrogen and to a carbon atom which is an integral part of said main chain of contiguous carbon atoms.

SAMUEL L. SCOTT.

REFERENCES CITED

The following references are of record in the file of this patent:

UNITED STATES PATENTS

| Number | Name | Date |
|---|---|---|
| 2,402,614 | Farlow | June 25, 1946 |
| 2,411,954 | Burke | Dec. 3, 1946 |